Sept. 29, 1925.  1,555,700
D. C. PICKETT
DIRECTION SIGNAL
Filed May 28, 1925
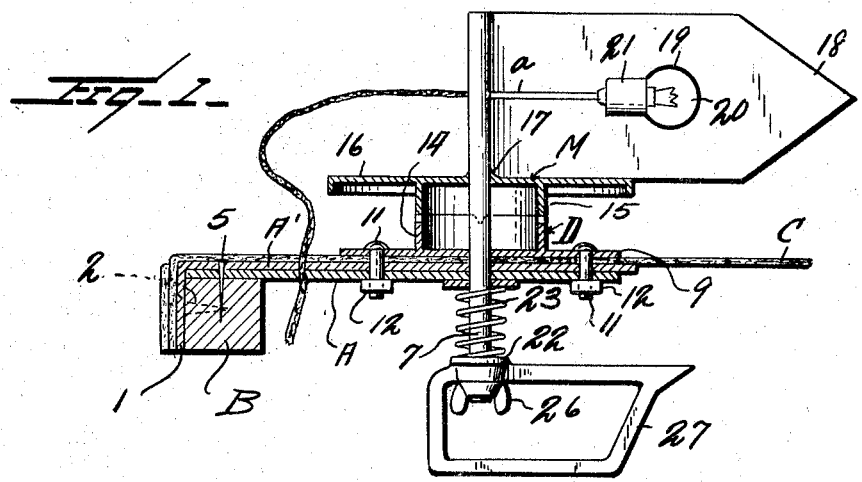
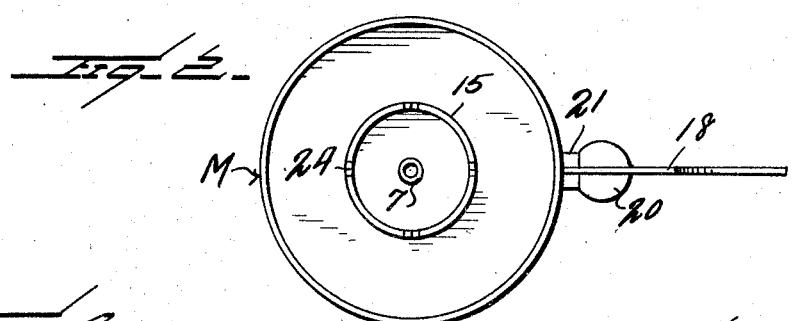
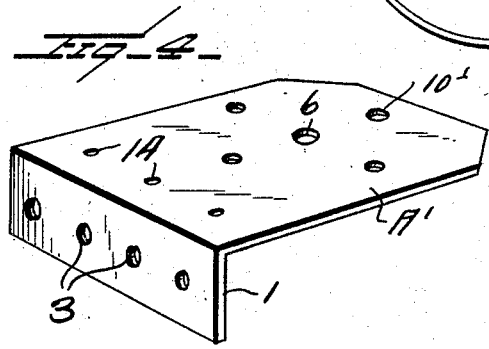
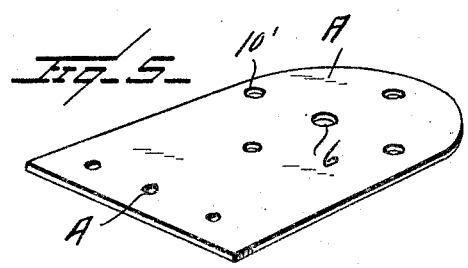
Inventor
D. C. Pickett
By Watson E. Coleman
Attorney Patented Sept. 29, 1925.

1,555,700

UNITED STATES PATENT OFFICE.

DUDLEY C. PICKETT, OF WISCONSIN RAPIDS, WISCONSIN.

DIRECTION SIGNAL.

Application filed May 28, 1925. Serial No. 33,536.

*To all whom it may concern:*

Be it known that I, DUDLEY C. PICKETT, a citizen of the United States, residing at Wisconsin Rapids, in the county of Wood and State of Wisconsin, have invented certain new and useful Improvements in Direction Signals, of which the following is a specification, reference being had to the accompanying drawings.

This invention relates to certain improvements in direction signals and has relation more particularly to a device of this general character especially designed for use in connection with a motor driven vehicle, and it is an object of the invention to provide a signal of this kind which is positioned above the top of the vehicle and preferably at the front left hand corner thereof together with means extending below the top for operating the signal.

The invention consists in the details of construction and in the combination and arrangement of the several parts of my improved direction signal whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating a signal constructed in accordance with an embodiment of my invention and in applied position;

Figure 2 is a view in bottom plan of the rotatable and signal carrying member as herein disclosed;

Figure 3 is a view in top plan of the stationary bearing member as herein comprised;

Figure 4 is a view in perspective of one of the supporting plates as herein disclosed;

Figure 5 is a view in perspective of the second supporting plate as herein embodied.

As disclosed in the accompanying drawings, B denotes the front bow of an automobile top or the like and preferably at the left side thereof so that my improved signal as herein disclosed will be positioned adjacent to the front left corner of the top of the vehicle.

A denotes a supporting plate having one end portion resting upon the bow B and extending inwardly thereof and superimposed upon the plate A is a second supporting plate A' the outer end of said plate being defined by a depending flange 1 which overlies the forward face of the bow B and is secured thereto by screws or the like as indicated at 2 in Figure 1, said flange 1 being provided with suitable openings 3 for the proper passage of the screws. The outer portions of the plates A and A' are provided with the openings 4 adapted to register when the plates are in assembled relation and through which the fastening members 5 are adapted to pass for engagement with the bow B, said fastening members 5 being as preferred. In applying the plates A and A' it is to be understood that the top cover C will have a requisite marginal portion disengaged from the bow B so that said plates may be readily slid into desired position.

The inner or free end portions of the plates A and A' are also provided with the registering openings 6 to permit the passage therethrough of a vertically disposed rod 7, said rod being also directed through the cover C and through a central opening 8 in the base plate 9 of the bearing member D. A marginal portion of the plate 9 is provided with the openings 10 which are adapted to register with the openings 10' in the plates A and A' for the insertion therethrough from above of the bolts 11 the lower or free end portions of the bolts having applied thereto the nuts 12 whereby the bearing member D is effectively secured or anchored to the supporting plates A and A'.

The plate 9 is provided with an upstanding annular flange 14 concentric to the opening 8 and contacting from above with said flange 14 is the edge of an annular flange 15 depending from the top plate 16 of the rotatable and signal carrying member M. The flange 15 is cencentric to the rod 7 which extends through and beyond the plate 16, said plate 16 being soldered, as at 17, or otherwise fixed to the rod 7.

Secured to and radiating from the upper portion of the rod 7 is an end portion of a signal plate or semaphore 18 provided therein with an opening 19. Positioned within the opening 19 is a light 20 preferably an incandescent bulb engaged with the socket 21 carried by the plate or semaphore 18. The socket 21 has leading from the contacts thereof the conductors a which are directed in the form of a cable through the rod 7 which is of a hollow type and suitably comprised within a requisite operating circuit. The lower portion of the rod 7 is provided with an enlargement 22 and between said enlargement 22 and the plate A is interposed an expansible member 23 herein disclosed as a coil spring encircling the rod 7, said member or spring operating to constantly urge the member M toward the member D with the lugs 24 depending from the flange 15 seated within the notches or recesses 25 provided in the upper or free marginal portion of the flange 14 so that normally the member M is locked against turning or rotary movement. The lugs 24 as well as the notches 25 are four in number and equidistantly spaced and so positioned that the semaphore or plate 18 may be held in a direction to indicate right or left turn or straight ahead.

Held to the lower portion of the rod 7 by the nut 26 or the like is an operating member 27, said member 27 being preferably coplanar with the plate or semaphore 18 so that the occupant of the car can readily determine by the arrangement or position of the member 27 the position or adjustment of the plate or semaphore 18.

From the foregoing description it is thought to be obvious that a direction signal constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A direction signal comprising, in combination with a support, a plate secured to said support, a stationary bearing member including a plate resting upon the first named plate, means for connecting said plates one to the other, the plate of the bearing member being provided with an upstanding annular flange, a rotary member comprising a plate and a depending annular flange contacting from above with the flange of the bearing member, a rod freely disposed through the first named plate and the plate of the bearing member and secured to the plate of the rotary member, said rod extending beyond the plate of the rotary member, a signal plate carried by the extended portion of the rod, the marginal portions of the flanges being provided with interfitting lugs and recesses to normally hold the rotary member against rotation, means coacting with the rod and constantly maintaining the flanges in contact, and an operating member carried by the lower portion of the rod.

2. A direction signal comprising, in combination with a support, a plate secured to said support, a stationary bearing member including a plate resting upon the first named plate, means for connecting said plates one to the other, the plate of the bearing member being provided with an upstanding annular flange, a rotary member comprising a plate and a depending annular flange contacting from above with the flange of the bearing member, a rod freely disposed through the first named plate and the plate of the bearing member and secured to the plate of the rotary member, said rod extending beyond the plate of the rotary member, a signal plate carried by the extended portion of the rod, the marginal portions of the flanges being provided with interfitting lugs and recesses to normally hold the rotary member against rotation, means coacting with the rod and constantly maintaining the flanges in contact, an operating member carried by the lower portion of the rod, and a supplemental supporting plate underlying the first named plate and secured to the support.

3. A direction signal comprising, in combination with a support, a plate secured to said support, a stationary bearing member including a plate resting upon the first named plate, means for connecting said plates one to the other, the plate of the bearing member being provided with an upstanding annular flange, a rotary member comprising a plate and a depending annular flange contacting from above with the flange of the bearing member, a rod freely disposed through the first named plate and the plate of the bearing member and secured to the plate of the rotary member, said rod extending beyond the plate of the rotary member, a signal plate carried by the extended portion of the rod, the marginal portions of the flanges being provided with interfitting lugs and recesses to normally hold the rotary member against rotation, means coacting with the rod and constantly maintaining the flanges in contact, an operating member carried by the lower portion of the rod, and an illuminating medium carried by the signal plate.

In testimony whereof I hereunto affix my signature.

DUDLEY C. PICKETT.